Aug. 11, 1936.  G. BÜHLER  2,050,782
METHOD OF MAKING BEARING BUSHINGS
Filed Sept. 9, 1933  2 Sheets-Sheet 1
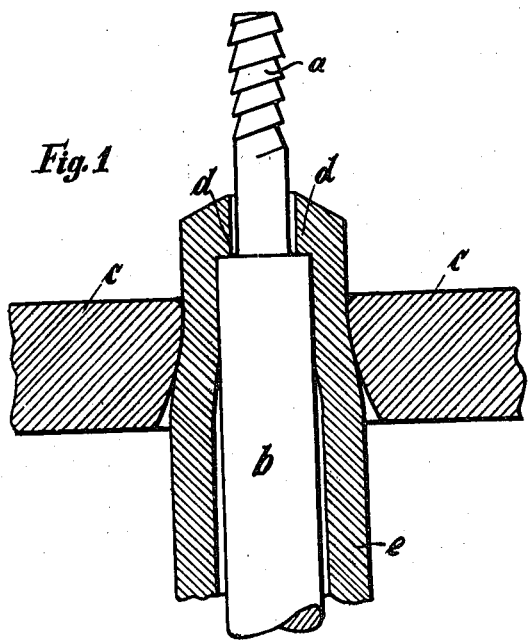
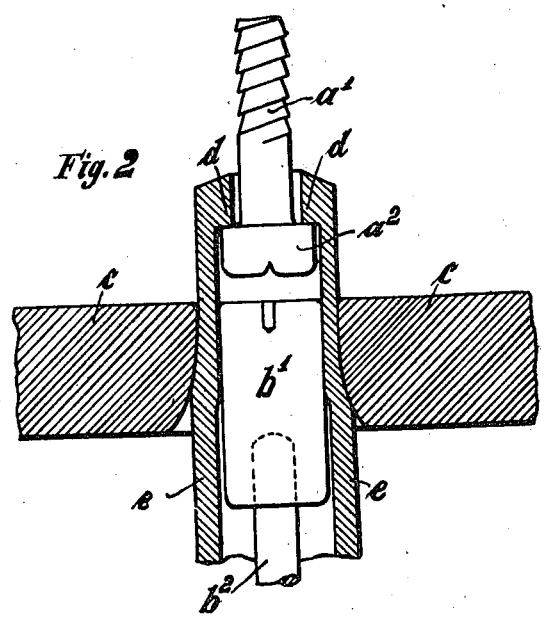
G. Bühler
INVENTOR
By: Marks & Clerk
ATTYS.

Aug. 11, 1936.  G. BÜHLER  2,050,782

METHOD OF MAKING BEARING BUSHINGS

Filed Sept. 9, 1933  2 Sheets-Sheet 2

G. Bühler
INVENTOR

By: Marks & Clark
ATTYS.

Patented Aug. 11, 1936

2,050,782

UNITED STATES PATENT OFFICE 2,050,782

METHOD OF MAKING BEARING BUSHINGS

Georg Bühler, Vienna, Austria

Application September 9, 1933, Serial No. 688,851
In Germany November 25, 1932

7 Claims. (Cl. 29—149.5)

This invention relates to improvements in the method of making bearing bushings.

It has previously been proposed to make bearing bushings by first producing a tube and working it into bushings by frequent cutting in the transverse direction and dividing the bearings longitudinally. Hitherto the tube was made by casting or pressing or other method but by intentionally avoiding a complete homogeneity of the single crystals in accordance with the generally accepted and prevailing theory that in the case of bearing metal with good bearing properties it is necessary that harder parts be embedded in a softer ground mass.

It has been discovered, however, that the carrying capacity of the bearing bushing is considerably improved if the crystals are absolutely homogeneous. It has been found that the carrying capacity of bearing bushings of such formation is 60% higher than the carrying capacity of bearing bushings made from the best previously known bearing bronze, the carrying capacity referring, as will be understood, to the loading capacity which may be applied before seizing occurs in the testing machine.

As distinguished from the previously known methods, the present improvement is obtained by frequently subjecting the starting material alternatively to an annealing and drawing process until a complete homogeneity of the crystallites is obtained.

The material for making the bushing preferably consists of the usual content of copper and tin, for instance, 92% copper and 8% tin with about 0.2 to 0.4% phosphorus, although the phosphorus may be replaced partially or entirely by equivalent materials such as silicon. The high content of phosphorus is regarded as new because the usual phosphorous bronzes and especially those for drawn material have a maximum phosphorous content of only 0.1%.

It has been discovered that the above stated phosphorous content which is important for obtaining satisfactory bearing properties requires a special procedure.

In order to avoid loss of the phosphorous content, it is, therefore, preferable to start with a cast hollow tube and to work or develop such tube by a drawing process.

However, numerous difficulties arise from making the hollow tube by casting. In the first place, there is the difficulty of obtaining a uniform structure of the hollow tube owing to the varying cooling conditions in the case of different wall thicknesses of the hollow tube. These must be obviated for preventing waste by a suitable selection of the different thicknesses of the molds employed.

Further difficulties arise from the use of an unsuitable core material. The phosphor-bronze has a very high shrinkage value of almost 1½%. If the core does not yield sufficiently, cracks will be formed in the hollow tube which though not visible to the naked eye, render the drawing impossible because the tube breaks at these cracked places. It is, therefore, very important that the core material possess sufficient elasticity. A sand-core is preferably used.

However, in spite of its elasticity, the core must be very stable so that it will not warp lengthwise during the casting operation because it is centered below and above in the mold and if the core warps, the tube will have irregular walls and, therefore, become unpracticable because the irregularity of the walls cannot be removed by the subsequent drawing operations and bearing bushings with irregular walls are undesirable. Consequently, cores according to German Patents 496,819 and 496,820 are preferably used according to the present method.

If a mold wall, for instance of cast iron is used externally and a sand core internally, the hollow tube will not be sufficiently uniform for the drawing operation. It contains casting stresses. These must be removed before the first drawing operation in view of the slight extension and very low strength or resistance of about 28 kilograms, that is to say the typically unsatisfactory extensibility of this material. On the other hand, however, the annealing temperature of about 650 to 700°, which is usual with other bronzes, must not be applied because the phosphorus would burn out. In order that this may be avoided, the annealing temperature must be kept low so that the phosphorus does not burn out but on the other hand it must be so high that the annealing is effective. Annealing temperatures between about 550 and 580° have proved to be most suitable.

During the first drawing operation, the material is very brittle and of slight strength or resistance. It has been found that the best properties with regard to bearing capacity are only obtained when the first annealing leaves the material inhomogeneous, that is to say, a typical change in the structure does not take place. The first drawing operation is, therefore, carried out as a typical compressive operation and not as an elongation operation. For this purpose, long mandrel drawing operations are used in view of the very unsatisfactory drawing properties of the material.

The annealing and drawing operations are now effected alternately and the material gradually becomes more homogeneous. After the sixth or seventh pulling or drawing operation, the material consists entirely of mixed crystals. During the drawing operations, the compressive pull or drawing operation is gradually converted into the elongating pull or drawing operation, and as the compressive and homogenizing of the material is increased, the low annealing temperatures need not be so accurately maintained.

However, the compressive effect predominates during the first three drawing operations. They are, therefore, effected as long mandrel drawing operations while the elongating effect predominates during the next three or four drawing operations. These drawing operations are, therefore, preferably effected as nail drawing operations.

In the accompanying drawings:

Figs. 1 and 2 are diagrammatical sectional views illustrating two different types of drawing operations to which the tube is subjected.

Figs. 3, 4, and 5 represent diagrammatically the three stages in the shaping of the material undergoing treatment to adapt it for taper drawing operations.

Figure 3:
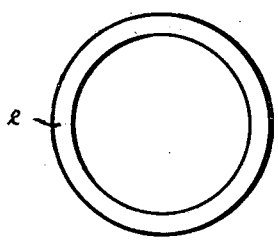
Figure 4:
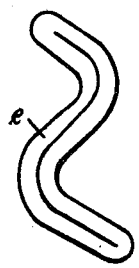
Figure 5:
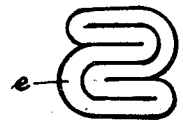

In Fig. 1 the material is indicated at $e$ and the apertured drawing plate at $c$. The neck $a$ of the drawing mandrel $b$ engages an internal flange or shoulder $d$ in the tubular material $e$ whereby the longitudinal thrust of the drawing tool is imparted to the material.

Owing to the magnitude of the force required in the drawing operations, the neck $a$ of the drawing tool is subjected to severe stresses and in order to avoid breakage of the neck, the latter is provided with notches similar to screw threads at which the cross section of the neck $a$ is only slightly reduced. The gripping jaws of the drawing member also receive a corresponding screw thread. Both threads engage in one another during the drawing operation. However, the neck $a$ is not screwed into the drawing member but the jaws of the drawing member are movable and at the moment when the drawing member is suspended to the draw chain, the drawing member is closed automatically and engages with the neck $a$ of the mandrel $b$.

The faces of the thread which take up the tractive force are disposed almost perpendicularly to the axis of the mandrel and although they engage in the neck to a slight depth, they present in their entirety a larger bearing surface than the cross section of the draw-neck. For this reason, the danger of breakage of the neck $a$ of the draw mandrel $b$ is avoided while this breaking frequently occurs in the hitherto known tube drawing devices. The tube adapted for making bearing bushings is uniformly compressed over the entire cross section by the drawing operation. The cross-sectional decreases which are obtained during the single drawing operations are approximately 70 to 80% relatively to the cross section of the starting material.

The following table shows some examples of the cross-sectional decreases used.

*Table of cross sectional decreases when drawing caro bronze tubes*

| Diameter | Wall | Cross section square millimeters | Cross sectional decreases | | |
|---|---|---|---|---|---|
| | | | Square millimeter | Percent | Total |
| 64 x 33 | 15.5 | 2362 | | | Per cent |
| 55 x 31 | 12.- | 1621 | 741 | 31.4 | |
| 48 x 28 | 10.- | 1194 | 427 | 18.1 | |
| 44 x 26 | 9.- | 990 | 204 | 8.6 | |
| 41 x 25 | 8.- | 829 | 161 | 6.8 | |
| 37 x 24 | 6.5 | 623 | 206 | 8.7 | |
| 33 x 22 | 5.5 | 475 | 148 | 6.3 | 79.9 |
| | | Total | 1887 | | 79.9 |
| 68 x 45 | 11.5 | 2042 | | | |
| 63 x 43 | 10.- | 1665 | 377 | 18.5 | |
| 57 x 40 | 8.5 | 1295 | 370 | 18.1 | |
| 52 x 38 | 7.- | 990 | 305 | 14.9 | |
| 47 x 36 | 5.5 | 717 | 273 | 13.4 | |
| 43 x 34 | 4.5 | 544 | 173 | 8.5 | 80.9 |
| 39 x 32 | 3.5 | 391 | 153 | 7.5 | |
| | | Total | 1651 | | 80.9 |
| 75 x 38 | 18.5 | 3284 | | | |
| 68 x 36 | 16.- | 2614 | 670 | 20.4 | |
| 63 x 35 | 14.- | 2155 | 459 | 14.- | |
| 56 x 33 | 11.5 | 1608 | 547 | 16.6 | |
| 51 x 31 | 10.- | 1288 | 320 | 9.7 | |
| 48 x 30 | 9.- | 1103 | 185 | 5.6 | |
| 44 x 28 | 8.- | 905 | 198 | 6.- | 72.3 |
| | | Total | 2379 | | 72.4 |
| 75 x 45 | 15.- | 2828 | | | |
| 68 x 43 | 12.5 | 2180 | 648 | 22.9 | |
| 62 x 41 | 10.5 | 1699 | 481 | 17.- | |
| 57 x 39 | 9.- | 1357 | 342 | 12.1 | |
| 53 x 37 | 8.- | 1131 | 226 | 8.- | |
| 49 x 35 | 7.- | 924 | 207 | 7.3 | |
| 45 x 33 | 6.- | 735 | 189 | 6.7 | 74.- |
| | | Total | 2093 | | 74.- |
| 86 x 54 | 16.- | 3519 | | | |
| 79 x 52 | 13.5 | 2778 | 741 | 21.1 | |
| 73 x 50 | 11.5 | 2221 | 557 | 15.8 | |
| 68 x 48 | 10.- | 1822 | 399 | 11.3 | |
| 64 x 46 | 9.- | 1555 | 267 | 7.6 | |
| 60 x 44 | 8.- | 1306 | 249 | 7.1 | |
| 56 x 42 | 7.- | 1078 | 228 | 6.5 | 69.4 |
| | | Total | 2441 | | 69.4 |
| 100 x 57 | 21.5 | 5302 | | | |
| 93 x 55 | 19.- | 4417 | 885 | 16.7 | |
| 87 x 53 | 17.- | 3739 | 678 | 12.7 | |
| 81 x 51 | 15.- | 3110 | 629 | 11.8 | |
| 75 x 48 | 13.5 | 2608 | 502 | 9.7 | |
| 67 x 45 | 11.- | 1936 | 672 | 12.6 | |
| 63 x 43 | 10.- | 1665 | 271 | 5.1 | 68.6 |
| | | Total | 3637 | | 68.6 |

Only the pulls following the sixth or seventh pull are dimensioning pulls and they are necessary because the original hollow cylinder is preferably not cast in these fine dimensions. On the termination of the first six pulls or drawing operations whose execution is greatly influenced by the inferior drawing properties of the materials, the diameter and wall thickness of the desired final product are obtained. However, the material is already so treated, homogenized and strengthened after the first six pulls or drawing operations that the pulls may now be effected as taper pulls in the usual manner. There is one annealing operation between each two drawing operations and during the first annealings the low annealing temperatures, the temperatures of 550 to 580°, must be maintained as much as possible while with the annealings at the end of the entire process the maintenance of these low limits is not so important because the losses of phosphorus cannot so easily occur.

In the case of draw plates and draw rings, which are known and generally used in practice, it would not be possible to draw a bronze which has practically no expansion and resistance. The material has only drawing properties from the third or fourth pull or drawing operation whereby it is possible to work with normal drawing devices.

Another annealing does not take place after the last pull or drawing operation. The tube resulting from the last pull or drawing operation and shown in distinctly marked lines is cut to the desired length in the mechanical workshop so as to be dimensioned for the intended purpose.

The form of drawing arrangement illustrated in Fig. 2 is employed for the fourth to the sixth or seventh drawing operations and the arrangement includes a draw plate $c$ through which the material $e$ is drawn by the drawing tool $a'$—$a^2$. In this construction the head $a^2$ of the drawing member is short and a draw mandrel $b'$ carried by a rod $b^2$ is arranged inside of the material.

The essential difference between the two drawing devices resides in the fact that in the arrangement according to Fig. 2, the mandrel $b'$ is stationary within the draw plate $c$ during the operation in the usual manner and only the drawing tool $a'$—$a^2$ moves with the tube, which latter is thereby subjected to the drawing operation so that a strong friction on the inner and outer surface is developed. In the drawing device according to Fig. 1, however, the draw mandrel moves along with the material undergoing treatment and extends throughout the entire length thereof whereby strong frictional forces are exerted on the exterior of the tube, the inner surface of the latter being subjected only to frictional force developed due to the stretching deformation of the material. Thus it is possible to draw brittle and less resistant materials which is shown, for example, by the hollow tube especially during the first drawing operation.

After the termination of each pull or draw operation, the long mandrel $b$ is withdrawn from the tube rearwardly.

Figure 6:
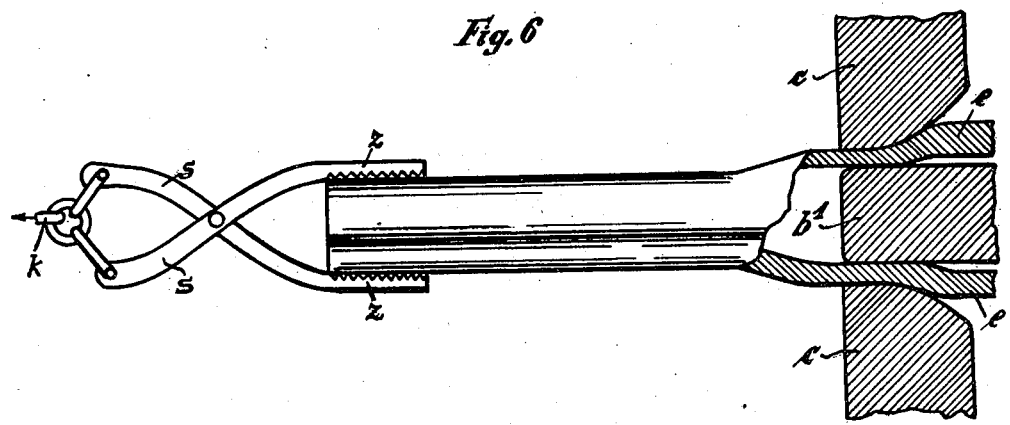
Fig. 6 is a diagrammatic view illustrating a taper drawing operation.

Instead of the "nail pull" drawing operation as illustrated, for instance, in Fig. 1, the drawing may be effected by a "taper pull" such as illustrated in Figs. 3 to 6. These two terms "taper pull" and "nail pull" refer, as will be understood, to the manner of applying the drawing force to the material undergoing treatment. In the case of the "nail pull" as illustrated in Figs. 1 and 2, the drawing head engages behind an internal shoulder of the article to be drawn, whereas, in the taper pull the drawing implement is applied to the article externally of the latter as illustrated in Fig. 6.

It is necessary, however, in adapting the "taper pull" to prepare the end of the tube for engagement with the drawing implement. Accordingly the substantially cylindrical tube as shown in Fig. 3 is folded into the form illustrated in Fig. 4 and finally the ends thereof are collapsed to present the shape illustrated in Fig. 5.

As shown in Fig. 6, the jaws $z$ of the drawing implements $s$—$s$ are applied to the folded tapered end of the tube $e$ and the drawing force is applied by means of a chain $k$.

Figure 7:
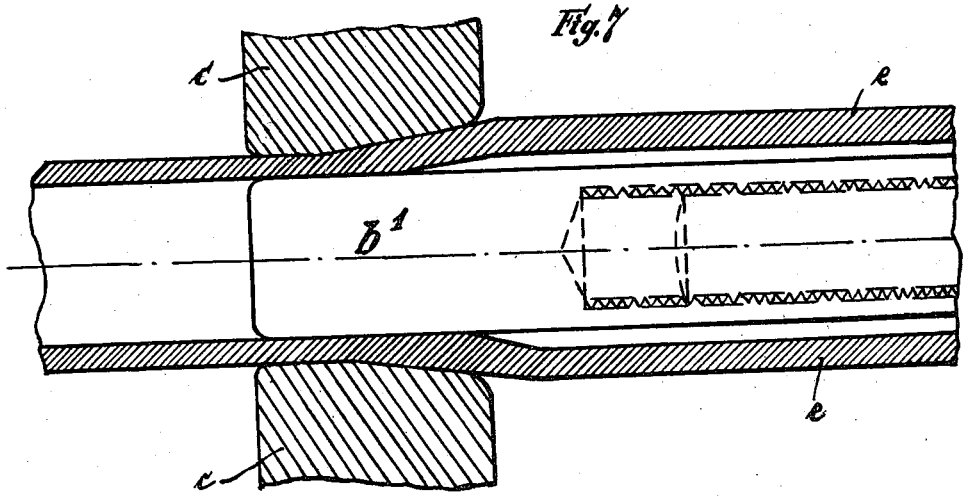
Fig. 7 is a similar view illustrating a dimensioning drawing operation.

Fig. 7 shows diagrammatically an ordinary "dimensioning pull", and the reference characters are the same as those employed in the remaining figures. In contra-distinction to the compression pull wherein no accurate dimensioning is effected, but merely a mechanical treatment of the inner structure of the material, a dimensioning pull serves exclusively or substantially for the purpose of changing the diameter of the wall thickness of the tube undergoing treatment.

It will thus be understood that the "taper pull" and the "nail pull" on the one hand and the pressure pull and the dimensioning pull on the other hand, are distinctly different operations. The first two terms imply the manner of applying the drawing force, that is to say, the taper pull implies that the drawing instrument is applied to the exterior of the tube, whereas the nail pull implies that the drawing implement is applied to the interior of the tube.

The diameters and wall dimensions of tubes and pulls preferably used according to the above described method are indicated in the following table:

*Table of the drawing operations of the various tubes from the casting*

(1) 64 x 33 mm. = 15.5 mm. wall thickness _____ Casting
   55 x 31 mm. = 12.— mm. wall thickness ⎫
   48 x 28 mm. = 10.— mm. wall thickness ⎬ Mandrel pulls
   44 x 26 mm. = 9.— mm. wall thickness ⎭
   41 x 25 mm. = 8.— mm. wall thickness ⎫
   37 x 24 mm. = 6.5 mm. wall thickness ⎬ Taper pulls
   33 x 22 mm. = 5.5 mm. wall thickness ⎭

(2) 68 x 45 mm. = 11.5 mm. wall thickness _____ Casting
   63 x 43 mm. = 10.— mm. wall thickness ⎫
   57 x 40 mm. = 8.5 mm. wall thickness ⎬ Mandrel pulls
   52 x 38 mm. = 7.— mm. wall thickness ⎭
   47 x 36 mm. = 5.5 mm. wall thickness ⎫
   43 x 34 mm. = 4.5 mm. wall thickness ⎬ Nail pulls
   39 x 32 mm. = 3.5 mm. wall thickness __ Taper pulls (3) 75 x 38 mm. = 18.5 mm. wall thickness _____ Casting
   68 x 36 mm. = 16.— mm. wall thickness ⎫
   63 x 35 mm. = 15.— mm. wall thickness ⎬ Mandrel pulls
   56 x 33 mm. = 11.5 mm. wall thickness ⎭
   51 x 31 mm. = 10.— mm. wall thickness __ Nail pull
   48 x 30 mm. = 9.— mm. wall thickness ⎫
   44 x 28 mm. = 8.— mm. wall thickness ⎬ Taper pulls (4) 75 x 45 mm. = 15.— mm. wall thickness _____ Casting
   68 x 43 mm. = 12.5 mm. wall thickness ⎫
   62 x 41 mm. = 10.5 mm. wall thickness ⎬ Mandrel pulls
   57 x 39 mm. = 9.— mm. wall thickness ⎭
   53 x 37 mm. = 8.— mm. wall thickness ⎫
   49 x 35 mm. = 7.— mm. wall thickness ⎬ Taper pulls
   45 x 33 mm. = 6.— mm. wall thickness ⎭

(5) 86 x 54 mm. = 16.— mm. wall thickness _____ Casting
   79 x 52 mm. = 13.5 mm. wall thickness ⎫
   73 x 50 mm. = 11.5 mm. wall thickness ⎬ Mandrel pulls
   68 x 48 mm. = 10.— mm. wall thickness ⎭
   64 x 46 mm. = 9.— mm. wall thickness __ Nail pull
   60 x 44 mm. = 8.— mm. wall thickness ⎫
   56 x 42 mm. = 7.— mm. wall thickness ⎬ Taper pulls (6) 100 x 57 mm. = 21.5 mm. wall thickness _____ Casting
   93 x 55 mm. = 19.— mm. wall thickness ⎫
   87 x 53 mm. = 17.— mm. wall thickness ⎬ Mandrel pulls
   81 x 51 mm. = 15.— mm. wall thickness ⎭
   75 x 48 mm. = 13.5 mm. wall thickness ⎫
   67 x 45 mm. = 11.— mm. wall thickness ⎬ Nail pulls
   63 x 43 mm. = 10.— mm. wall thickness ⎭

What I claim is:

1. A method of making bearing bushings from tin bronze with a phosphorous content of from substantially 0.2% to 0.4% phosphorus, consisting in casting a tube in a mold having a core permitting shrinkage of the molded tube, annealing said tube at a temperature substantially 550° to 580°, alternately subjecting the tube to several initial compressive drawing and annealing operations at an annealing temperature not exceeding 600°, alternately subjecting said tube to several additional elongating pulling and annealing operations, alternately subjecting said tube to dimensioning drawing and annealing operations and dividing the tube into single length bearing bushings.

2. A method of making bearing bushings from tin bronze with a phosphorous content of from substantially 0.2% to 0.4% phosphorus, consisting in casting a tube, annealing said tube at a temperature of substantially 550° to 580°, alternately subjecting the tube to drawing and annealing operations, the drawing operations progressing from a compressive effect to an elongating and finally to a dimensioning effect and the annealing temperature being maintained below substantially 900°.

3. A method of making bearing bushings from tin bronze with a phosphorous content of from substantially 0.2% to 0.4% phosphorus consisting in casting a tube, alternately subjecting the tube to annealing and drawing operations, the preliminary drawing operations producing a compressive effect and the pulling drawing operations producing elongating, and dimensioning effects, the preliminary annealing temperature being from substantially 550° to 580°.

4. A method of making bearing bushings from tin bronze with a phosphorous content of from substantially 0.2% to 0.4% phosphorus, consisting in casting a tube, alternately subjecting the tube to annealing and drawing operations, the preliminary drawing operations producing a compressive effect and the pulling drawing operations producing elongating, tapering and dimensioning effects, the preliminary annealing temperature being from substantially 550° to 580°, and the annealing operations between the following compressive drawing operations being effected at a temperature not exceeding 600°, and the annealing operations between the following further final elongating and dimensioning operations being effected at a temperature between 550° and 900° C.

5. A method of making bearing bushings from tin bronze with a phosphorous content of from substantially 0.2% to 0.4% phosphorus, consisting in casting a tube, alternately subjecting said tube to annealing and drawing operations at an annealing temperature throughout the first six drawing operations not exceeding 600° to prevent loss of the phosphorus.

6. A method of making bearing bushings from tin bronze with a phosphorous content of from substantially 0.2% to 0.4% phosphorus, consisting in casting a tube, alternately subjecting said tube to annealing and drawing operations at an annealing temperature throughout the first six drawing operations not exceeding 600° to prevent loss of the phosphorus, the several initial drawing operations producing a compressive effect and the following drawing operations producing an elongating effect upon the tube.

7. A method of making bearing bushings from tin bronze with a phosphorous content of from substantially 0.2% to 0.4% phosphorus, consisting in casting a tube, alternately subjecting said tube to annealing and drawing operations at an annealing temperature throughout the first several, about six drawing operations not exceeding 600° to prevent loss of the phosphorus, the first several about three drawing operations producing a compressive effect and the further of these drawing operations producing an elongating effect upon the tube, the rest of the drawing operations subjecting said tube to dimensioning effects.

GEORG BÜHLER.